Feb. 7, 1961   G. A. DMITROFF ET AL   2,970,440
STARTING SYSTEM FOR ENGINES

Filed Sept. 2, 1958   2 Sheets-Sheet 1

INVENTORS
GEORGE A. DMITROFF
EDGAR ROBITAILLE, JR.

BY Jack N. McCarthy
AGENT

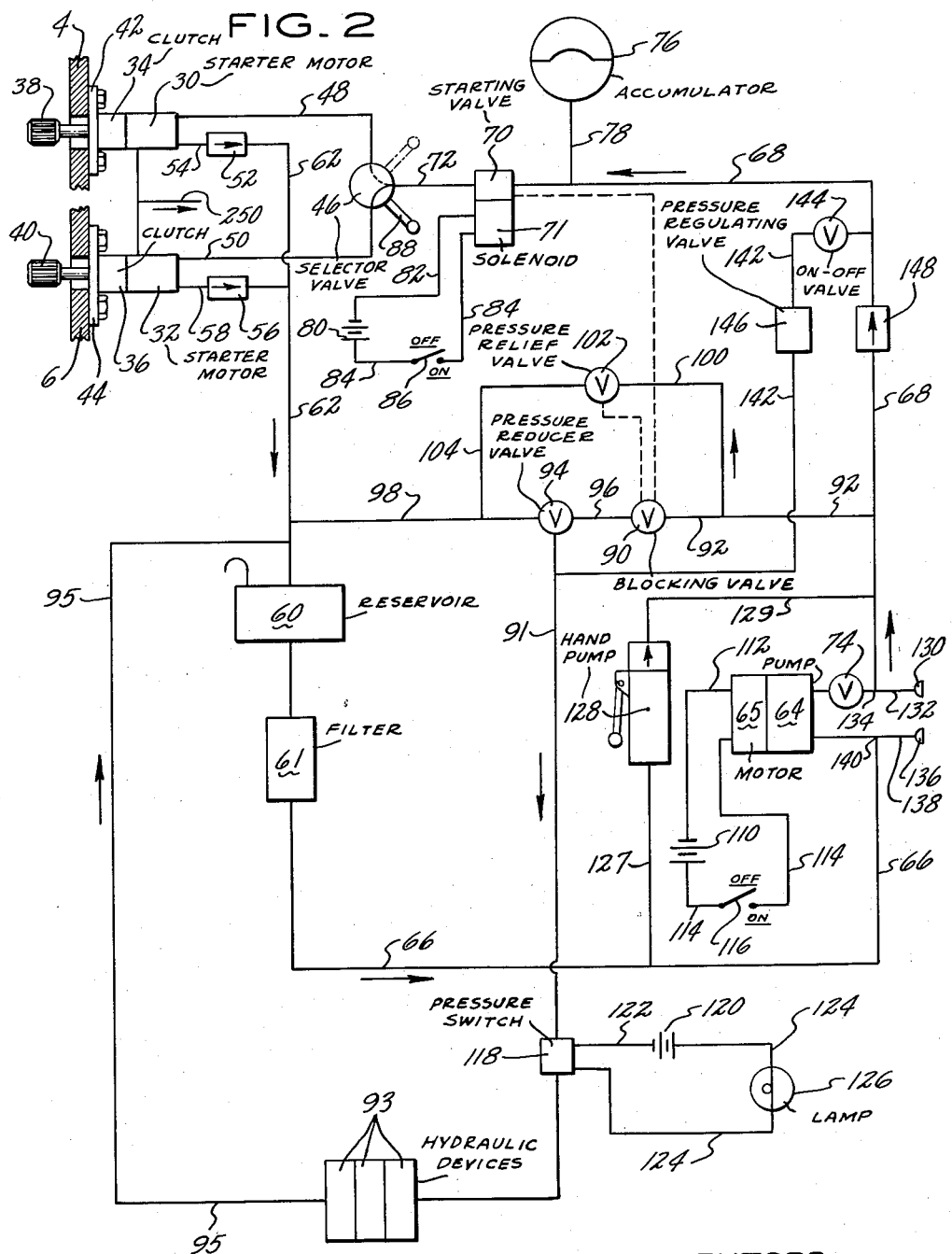

2,970,440

STARTING SYSTEM FOR ENGINES

George A. Dmitroff, Trumbull, and Edgar Robitaille, Jr., Bridgeport, Conn., assignors to United Aircraft Corporation, East Hartford, Conn., a corporation of Delaware Filed Sept. 2, 1958, Ser. No. 758,401

22 Claims. (Cl. 60—51)

This invention relates to a hydraulic starting system for engines and in particular for gas turbine engines.

An object of this invention is to provide a starting system which eliminates heavy starter motors and heavy current conducting bus bars.

Another object of this invention is to provide a starting system having means for applying an external hydraulic pump, or pump and supply, thereto, in the event the internal motor pump or fluid supply means becomes inoperative.

A further object of this invention is to provide a starting system having means for manually operating said system in the event the internal motor pump becomes inoperative and an external hydraulic pump is not available or not desirable to use.

Another object of this invention is to provide a starting system which has lighter weight and provides greater flexibility than existing systems, minimizing duplication of components.

A further object of this invention is to provide a starting system which will enable the operation of the utility system for the duration of the accumulator charge in the event of an emergency such as motor pump failure.

Another object if this invention is to provide a starting system which is incorporated with the utility system. In a helicopter, for example, the utility system could provide a motive fluid to hydraulically actuate landing gear, taxi gear or a cargo hoist.

A further object of this invention is to provide a starting system having an accumulator for driving a hydraulic starter motor and means for supplying the accumulator with the necessary pressure.

Another object of this invention is to provide a starting system which will indicate to the pilot that it is charged to be able to start an engine and that the utility system is under operating pressure.

A further object of this invention is to provide a blocking valve and a relief valve which are connected to prevent flow through the blocking valve until a predetermined fluid pressure is reached in the relief valve.

Another object of this invention is to provide a compound valve having two valves one of which is actuated by the other to move it to an open position and means including a third valve which is connected to release the open valve to permit it to close.

Other objects or advantages will be apparent from the specification and from the accompanying drawings which illustrate the invention.

Fig. 2 is a schematic view of the hydraulic starting system having two outlets.

Figure 1:
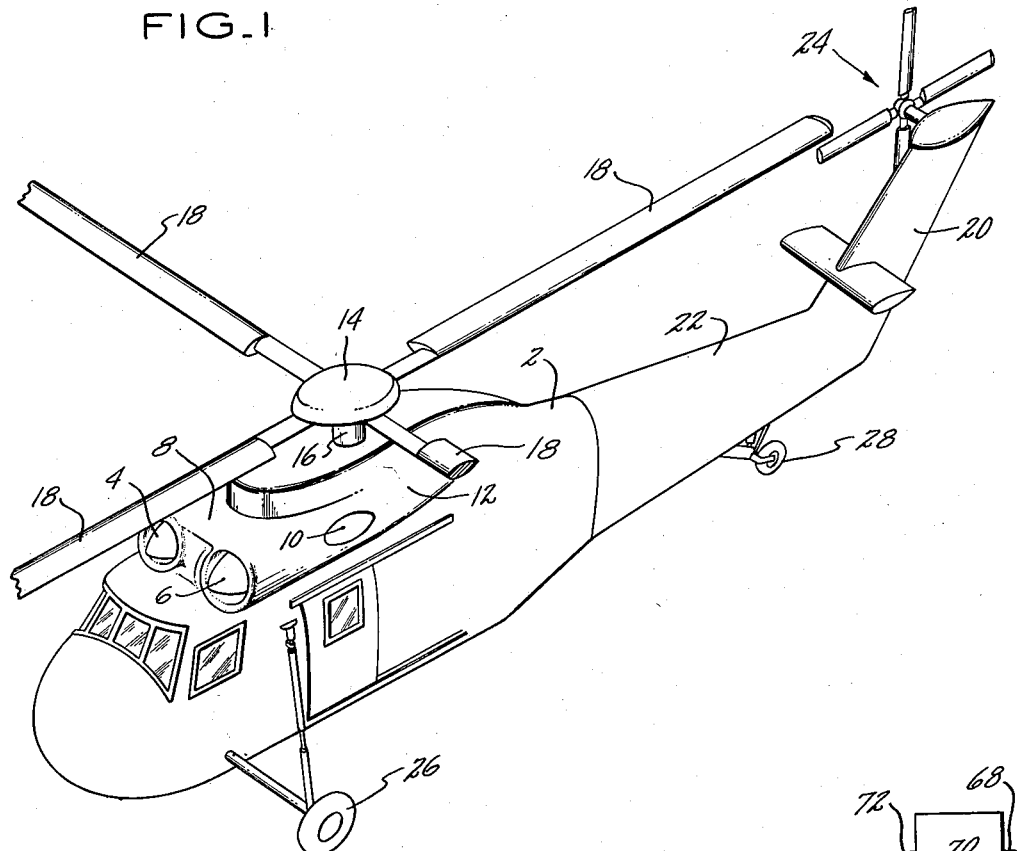
Fig. 1 is a perspective view of a helicopter having a power plant with two jet engines for driving its rotor system.

While Fig. 1 shows a helicopter having a specific configuration, it is to be understood that the power transmission means can be used on any type of helicopter. Further, referring to Fig. 1, a helicopter is shown having a body 2 which generally houses the pilot and cargo or passenger compartments. The power plant is shown located on top of the helicopter comprising two gas turbine engines 4 and 6 which are mounted in a housing 8 in a side-by-side relationship. Their exhaust is directed from the side of the housing through openings 10. A main rotor pylon 12 covers the power transmission system and extends between the housing 8 and the body 2 of the helicopter. The main rotor head 14 is supported on the upper end of an upright drive shaft 16 which extends upwardly from the power transmission system. This system is connected between said drive shaft and two gas turbine engines 4 and 6. A power transmission system which can be used in a helicopter of this type is shown and claimed in U.S. application Serial No. 757,881, filed August 28, 1958, for a Power Transmission System by Mr. Frederick C. Beurer. Rotor blades 18 are mounted on the rotor head in a usual manner. The helicopter may be controlled by any control mechanism desired; one suitable control mechanism is shown in the patent to Alex, U.S. Patent No. 2,811,324. A rear pylon 20 extends upwardly from the tail cone 22. A tail rotor 24 is mounted on said pylon. Conventional forward landing gear 26 and rear landing gear 28 are shown thereon.

Fig. 2 shows two hydraulic starter motors 30 and 32 connected through over-running clutches 34 and 36, respectively, to cooperating starting pinion gears 38 and 40. The clutches 34 and 36 are shown fixed to the engines 4 and 6 by the use of flanges 42 and 44. These clutches are provided to disengage the hydraulic motors from the engines at a predetermined speed. The inlet to the hydraulic starter motor 30 is attached to one outlet of a two-way selector valve 46 by conduit 48. The inlet of the hydraulic starter motor 32 is connected to the other outlet of the two-way selector valve 46 by conduit 50. The outlet of the hydraulic starter motor 30 is connected to the inlet of a check valve 52 by conduit 54 and the outlet of the hydraulic starter motor 32 is connected to the inlet of a check valve 56 by conduit 58. Each outlet of the check valves 52 and 56 is connected to a reservoir 60 by conduit 62.

Reservoir 60 is vented to atmosphere and has an outlet connected to the inlet of a motor driven pump 64 by a conduit 66. A filter 61 is located in conduit 66. The outlet of pump 64 is connected to the inlet of the two-way selector valve 46 by conduit 68, starting valve 70 and conduit 72. A check valve 74 is located at the outlet of pump 64 to prevent reverse flow through said pump. This is not necessary if a pump is used which does not permit reverse flow therethrough. Pump 64 is shown having an electrical motor 65 for driving it with a power source 110. One side of said source 110 is connected directly to the electrical motor 65 by an electrical conductor 112 and the other side of the source 110 is connected to the electrical motor 65 by an electrical conductor 114 having an "On" and "Off" switch 116 located therein.

An accumulator 76 is connected to conduit 68 by conduit 78 adjacent the inlet to starting valve 70. Starting valve 70 has two positions, "Open" and "Closed," to permit fluid in conduit 68 to pass through conduit 72 to the two-way selector valve 46 or to prevent said flow. Starting valve 70 is solenoid actuated and is shown having a power source 80 with one side connected directly to the solenoid 71 of the valve 70 by an electrical conductor 82 and with the other side of the source 80 connected to the solenoid of the valve 70 by an electrical conductor 84 having an "On" and "Off" switch 86 located therein. When the switch 86 is in its "Off" position, the valve 70 is biased to its "Closed" position, and as the switch is placed in it "On" position, the solenoid 71 is energized and moves valve 70 to its "Open" position. The two-way selector valve has a manual lever 88 for actuating said valve. When the valve is in the position shown in full lines, the fluid is directed from conduit 72 into conduit 50. When the valve is in the position shown by the dotted lines, the fluid flows from conduit 72 to conduit 48.

A check valve 148 is located in conduit 68 between the outlet of the check valve means at pump 64 and the connection of the accumulator conduit 78 permitting flow only to said accumulator. Conduit 68 is connected at a point between the outlet of the check valve means 74 at pump 64 and the check valve 148, to the inlet of a blocking valve 90 by a conduit 92. The outlet of the blocking valve 90 is connected to the inlet of a pressure reducer valve 94 by conduit 96. Blocking valve 90 has two positions, "Open" and "Closed," to permit fluid in conduit 92 to pass through conduit 96 to the pressure reducer valve 94 or to prevent said flow. The outlet of the pressure reducer valve, giving the desired reduced pressure, is connected to a utility system by a conduit 91 which in a helicopter operates such devices 93 as taxi gear motors, cargo hoisting mechanisms, and nose door actuators. A pressure reducer valve is unnecessary if the output pressure of the blocking valve is satisfactory for operation of the utility system. The outlets of these utility devices are connected to conduit 62 by a conduit 95. An electrical pressure switch 118 is located in line 91 and is set to remain open until closed by a desired pressure in the line 91. One terminal of the switch 118 is connected to one side of a power source 120 by an electrical conductor 122 and the other terminal of the pressure switch 118 is connected to the other side of the power source 120 by an electrical conductor 124. An indicating lamp 126 is located in conductor 124. The second outlet of the pressure reducer valve bypassing excess fluid is connected to conduit 62, and therefore to reservoir 60, by conduit 98. Conduit 92 is connected to conduit 98 by a conduit 100, pressure relief valve 102 and conduit 104 to provide means for building up the pressure in line 68 and accumulator 76 in a way which will be described later.

Pressure relief valve 102 has a connection, shown in dotted lines on Fig. 2, with blocking valve 90 so that said bocking valve will automatically be moved to its "Open" position by the action of the pressure relief valve when the starting system pressure in conduits 68, 92 and 100 and accumulator 76 reaches its predetermined pressure setting but will not close by any action of the pressure relief valve. This can be a mechanical connection or an electrical device which includes a solenoid operated switch, biased to an open position, and closed by positioning of the relief valve to an open position. The closing of the switch could operate one solenoid which, when energized, opens blocking valve 90, said blocking valve being biased to a closed position, and another solenoid which keeps the switch closed after the movement of the pressure relief valve 102 to a closed position when the pressure drops after the blocking valve 90 has opened. The blocking valve also has a connection, shown in dotted lines on Fig. 2, with the starting valve 70 so that when the starting valve is in its "Closed" position the blocking valve 90 will remain open, once opened by the relief valve 102, and when the starting valve is moved to its "Open" position, the blocking valve will not be held open, if the pressure relief valve 102 has already opened the blocking valve, but will automatically be moved to its "Closed" position. This can be a mechanical connection or an electrical device which includes a second switch biased to a closed position in the circuit of both of the solenoids referred to above, which is opened by positioning of the starting valve 70 in its "Open" position to de-energize both solenoids which then permits the blocking valve 90 to move to its "Closed" position and the switch to open.

Figure 3:
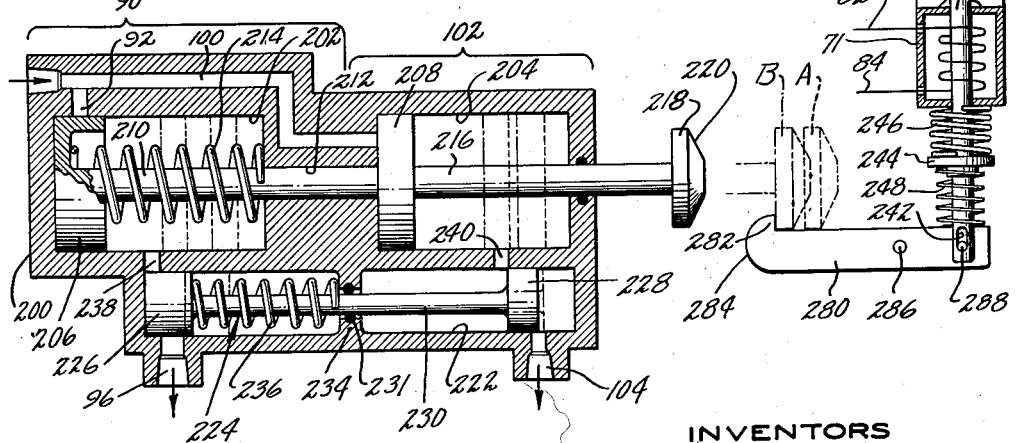
Fig. 3 is an enlarged view of a combined form of the blocking valve and relief valve.

A specific valve arrangement connecting the blocking valve 90, pressure relief valve 102, and starting valve 70 is shown in Fig. 3. This compound valve comprises a housing 200 having a cylindrical bore located in each end thereof having coinciding longitudinal axes. Cylindrical bore 202 forms part of the blocking valve 90 and bore 204 forms part of the relief valve 102. A piston member 206 is mounted in cylindrical bore 202 for movement therein and a piston 208 is positioned in bore 204 for movement therein. Pistons 206 and 208 are interconnected by a shaft 210 which passes through an opening 212 in the center of the housing 200. A spring 214 is located in bore 202 around shaft 210 between the right end of the bore 202 and the right face of piston 206. This biases the pistons 206 and 208 to the left.

A rod 216 extends from the right face of piston 208 through the right end of bore 204 and housing 200 to the exterior thereof. An annular holding member 218 is positioned on the free end of rod 216 for a purpose to be hereinafter described. The right face of holding member 218 is rounded or beveled such as at 220. Passageway 92 connects fluid from conduit 68 to the left end of bore 202. This opening or passageway 92 into bore 202 is covered by piston 206 in its spring biased position to the left. Passageway 100 connects passageway 92 to the pressure relief valve 102. Passageway 100 opens into bore 204 behind the left face of piston 208.

A third bore 222 is located in the housing 200 having its longitudinal axis parallel to the axis of bores 202 and 204. A piston member 224 is located in said bore 222 having two pistons 226 and 228 therein interconnected by rod 230. The rod 230 is of such length as to provide a valving action to be hereinafter described. Means are provided in bore 222 for sealing the piston rod 230 so that there is no fluid leakage between the two sections of the bore 222. A sealing ring 231 has been shown located in an annular projection 234. A spring 236 is located around the piston rod 230 between the right face of piston 226 and the left face of the annular projection 234. This action biases piston member 224 to the left.

A passage way 238 connects the bore 202 adjacent its midpoint to bore 222 at a point covered by piston 226 when it is in its spring biased position. A passageway 96 opens into bore 222 at a point covered by piston 226 when it is in its spring biased position. When the piston 226 is in the right hand position of bore 222, the passageway 238 is connected to passageway 96. A passageway 240 connects bore 204 at its midportion to bore 222 at a point to the left of piston 228 when it is in its spring biased position to the left. A passageway 104 which is the outlet from the pressure relief valve opens into bore 222 to the right of the right face of piston 228 in its spring biased position. When the piston 228 is in the right hand position of bore 222, the passageway 104 opens into bore 222 to the left of the left face of piston 228 connecting passageway 240 with passageway 104. Since the valve arrangement in Fig. 3 is schematic in form, it is to be understood that drain and venting passages are considered included where necessary such as from the end of a bore to prevent the trapping of fluid between said end of said bore and the end of a piston moving toward said end of said bore.

A latch 280 is provided having a hook 282 with one rounded end 284. The latch is mounted on a fixed pivot at 286 and connected to the valve 70 by a pin 288. The actuating rod 241 of solenoid 71 for moving valve 70 extends from the opposite end of the solenoid and has a longitudinal hole 242 therein in which pin 288 is positioned. A flange 244 is fixed to rod 241 between solenoid 71 and the end of latch 280. A spring 246 is positioned around the rod 241 between the end of solenoid 71 and flange 244. This spring 246 biases the valve 70 to its "Closed" position. A second spring 248 is positioned around the rod 241 between the flange 244 and latch 280. This spring 248 is lighter than spring 246 and merely biases the latch into its position as shown in Fig. 3.

The latch 280 is positioned in line with the annular holding member 218 so that the rounded or beveled face 220 of the member will engage the rounded end 284 of the latch to cam the latch down and place the annular holding member 218 behind the hook 282 when the piston 208 moves to position B (see Fig. 3).

While the latch has been shown attached to the actuating rod of valve 70, a separate solenoid can be used for a separate latch rod which would have one spring 246 biasing the latch to its holding position. The pin 288 would then be in a snug hole. In this arrangement one electrical connector could connect one terminal of the separate solenoid to the like terminal of solenoid 71 and another electrical connector could connect the other terminal of the separate solenoid to the other like terminal of solenoid 71. The separate solenoid could have any means for stopping the separate latch rod in its holding position.

While a motor driven pump 64 has been shown incorporated in the system, in the event of a failure of this pump and a hand pump 128 is connected between conduit 66 and 68 around said motor driven pump 64. A conduit 127 connects the inlet of the pump 128 to conduit 66 and conduit 129 connects the outlet of the pump 128 to conduit 68. A further provision in the event of a failure of a motor driven pump 64, or of the loss of fluid from the reservoir 60, is the location of hydraulic inlet and outlet connectors in the system so that an external hydraulic pump, supply, or pump and supply, can be connected to the system. An inlet connector 130 is shown connected to conduit 68 by a conduit 132 at 134, and an outlet connector 136 is shown connected to conduit 66 by a conduit 138 at 140. These connectors 130 and 136 can be of the quick connect-disconnect type to provide for speed and ease of connection.

To provide for accumulator operation of the utility devices, a conduit 142 connects conduit 68 at a point between check valve 148 and the connection of the accumulator conduit 78 to conduit 91 having an "On-Off" valve 144 located therein adjacent the conduit 68 and a pressure regulating valve 146 located therein between the valve 144 and conduit 91. The valve 146 is set at the operating pressure of the utility system.

The hydraulic motors 30 and 32 have a drain line 250 connected thereto to take care of any leakage therein. It is also noted that the operating means for pump 128, switch 86, switch 116, the indicating lamp 126, lever 88 and valve 144 are located in the pilot's compartment for convenient operation of this system.

Operation

In starting the engines on the helicopter shown in Fig. 1, the pilot will move lever 88 to select whichever engine he desires to start first. Assuming he desires to start engine 6 first, the lever 88 will be placed in its position shown in full lines in Fig. 2. Switch 86 will be in its "Off" position, switch 116 will be in its "Off" position and indicating lamp 126 will be off. Accumulator 76 will be charged from the last operation of the system. Switch 116 is then placed in its "On" position thereby starting the motor 65 and pump 64.

This will permit fluid to be available to the utility system thereby operating switch 118 and lighting the indicating lamp 126. Switch 86 is now placed in its "On" position, this opens valve 70 and permits the accumulator charge to pass through valve 70, conduit 72, two-way selector valve 46, and conduit 50 to hydraulic motor 32. Motor 32 then rotates the shaft of the engine 6 through clutch 36 and gear 40.

When valve 70 is opened, this action permits blocking valve 90 to close. The lowering of pressure in line 91 opens switch 118 to turn indicating lamp 126 off. Now, when switch 86 is opened, the pump 64 will start to recharge the accumulator 76. When the predetermined accumulator charge is reached, the pressure relief valve 102 will be opened and this action will open the blocking valve 90. Check valve 148 will prevent the accumulator charge from passing back into the utility system. Opening of the blocking valve 90 permits the pressure to be readmitted to the utility system closing the switch 118 and turning the indicating lamp 126 on.

The accumulator can be made of such size to permit two normal starts with engine assist or one start without engine assist. Now the two-way selector valve 46 is placed in its position shown in dotted lines in Fig. 2 to start engine 4. The sequence of events is the same for starting engine 4 as it is for engine 6.

If a new system having an uncharged accumulator is being used, the accumulator may be charged by the motor pump 64 or hand pump 128. When it is charged, the system will operate to start either engine 4 or 6 as disclosed above.

If there is a failure of the pump 64, an external pump can be connected to connectors 130 and 136 to provide an operating pressure. Further, hand pump 128 can also be used to charge the accumulator in case of such a failure.

In the event of the failure of pump 64, the valve 144 can be placed in its open position and the utility system can be operated by the accumulator 76 for the duration of the charge.

With reference to the valve shown in Fig. 3, as the pressure enters housing 200, it passes through passageway 92 to the side of piston 206 and through passageway 100 to the end face of piston 208. As pressure in passageway 100 builds up, this action moves piston 208 and thereby piston 206 to the right. This action also moves holding member 218 to the right. The piston 206 uncovers the opening of passageway 92 into bore 206. This pressure is also applied to move the relief valve piston 206. The pressure on the two pistons moves them to position A.

This movement connects passageway 238 to passageway 92 through bore 202 and connects passageway 240 to passageway 100 through bore 204. This uncovering of passageway 240 permits fluid to pass into bore 222 between the annular member 231 and the left face of piston 228. This action moves piston 228 and therefore piston 226 to the right against the spring 236. Passageway 238 is connected to bore 222 and passageway 240 is then connected to passageway 104 permitting pressure to be released through the pressure relief valve 102. At the full movement of pistons 226 and 228 to the right, bore 222 is connected to passageway 96.

As the pistons 206 and 208 were moved to position A, the holding member also cammed over the hook 282 of latch 280, said hook being biased to its holding position by springs 246 and 248.

As the pressure is released through the pressure relief valve 102, the pistons 206 and 208 along with holding member 218 are permitted to move back to position B, in which position the piston 208 covers the passageway 240 thereby closing the pressure relief valve. Holding member 218 is then caught by the hook 282 of latch 280. The pressure in the left end of bore 222 keeps the piston member 224 in its righ position.

As the solenoid 71 is actuated to open starting valve 70, the rod 241 rotates latch 280 so that the hook 282 releases the holding member 218. This permits the spring 214 to move the pistons 206, 208, and holding member 218 to the left. When the piston 206 closes passageway 238, the blocking valve is closed and the piston member 224 is biased to the left by spring 236.

It is to be understood that the invention is not limited to the specific description above or to the specific figures, but may be used in other ways without departure from its spirit as defined by the following claims.

We claim:

1. In combination, a motor, an accumulator for operating said motor, first valve means connecting said accumulator to said motor, a fluid supply under pressure, first means connecting said accumulator to said fluid supply under pressure, said first means including a check valve, a hydraulically driven device, second means connecting said hydraulically driven device to said fluid supply under pressure, said last named means including a blocking valve, a pressure relief valve, third means connecting said pressure relief valve to said fluid supply under pressure, means for opening said blocking valve when said pressure relief valve opens, and means for releasing said blocking valve for movement to a closed position when said first valve means opens.

2. In combination, a motor, an accumulator for operating said motor, first valve means connecting said accumulator to said motor, a fluid supply under pressure, said fluid supply including a pump having an outlet, first means connecting said accumulator to the outlet of said pump, said first means including a check valve, a hydraulically driven device, second means connecting said hydraulically driven device to the outlet of said pump, said last named means including a blocking valve, a pressure relief valve, third means connecting said pressure relief valve to the outlet of said pump, means for opening said blocking valve when said pressure relief valve opens, and means for releasing said blocking valve for movement to a closed position when said first valve means opens.

3. In combination, a motor, an accumulator for operating said motor, first valve means connecting said accumulator to said motor, a fluid supply under pressure, first means connecting said accumulator to said fluid supply under pressure, said first means including a check valve, means for permitting reverse flow around said check valve, a hydraulically driven device, second means connecting said hydraulically driven device to said fluid supply under pressure, said last named means including a blocking valve, a pressure relief valve, third means connecting said pressure relief valve to said fluid supply under pressure, means for opening said blocking valve when said pressure relief valve opens, and means for releasing said blocking valve for movement to a closed position when said first valve means opens.

4. In combination, a motor, an accumulator for operating said motor, first valve means connecting said accumulator to said motor, a fluid supply under pressure, a first conduit connecting said accumulator to said fluid supply under pressure, said conduit including a check valve, a hydraulically driven device, a second conduit connecting said hydraulically driven device to said fluid supply under pressure, said last named means including a blocking valve, a pressure relief valve, a third conduit connecting said pressure relief valve to said first conduit between said check valve and said fluid supply under pressure, means for opening said blocking valve when said pressure relief valve opens, and means for releasing said blocking valve for movement to a closed position when said first valve means opens.

5. In combination, a hydraulic motor having an inlet and outlet, an accumulator for operating said motor, first valve means connecting said accumulator to the inlet of said motor, a fluid supply under pressure, said fluid supply under pressure including a pump and reservoir, first means connecting said accumulator to said pump, said first means including a check valve, a hydraulically driven device, second means connecting said hydraulically driven device to said pump, said last named means including a blocking valve, a pressure relief valve, third means connecting said pressure relief valve to said pump, fourth means connecting the outlet of said motor to said reservoir, means for opening said blocking valve when said pressure relief valve opens, and means for releasing said blocking valve for movement to a closed position when said first valve means opens.

6. In combination, a motor, an accumulator for operating said motor, first valve means connecting said accumulator to said motor, a fluid supply under pressure, first means connecting said accumulator to said fluid supply under pressure, said first means including a check valve, a hydraulically driven device, second means connecting said hydraulically driven device to said fluid supply under pressure, said last named means including a blocking valve, said blocking valve being biased closed, a pressure relief valve, third means connecting said pressure relief valve to said fluid supply under pressure, fourth means connecting said pressure relief valve to said blocking valve, said fourth connecting means providing for a movement of the blocking valve to an open position when said relief valve is opened, and fifth means connecting said first valve means to said blocking valve, said fifth connecting means providing for releasing said blocking valve for movement to a closed position when said first valve means opens.

7. In combination, a motor, an accumulator for operating said motor, first valve means connecting said accumulator to said motor, a fluid supply under pressure, first means connecting said accumulator to said fluid supply under pressure, said first means including a check valve, a hydraulically driven device, second means connecting said hydraulically driven device to said fluid supply under pressure, said last means named means including a blocking valve, a pressure relief valve, and third means connecting said pressure relief valve to said fluid supply under pressure, said blocking valve being responsive to said pressure relief valve for opening, said blocking valve being responsive to said starting valve for closing.

8. In combination, a hydraulic motor having an inlet and outlet, an accumulator for operating said motor, first valve means connecting said accumulator to the inlet of said motor, a fluid supply under pressure, said fluid supply under pressure including a pump and reservoir, first means connecting said accumulator to said pump, said first means including a check valve, a hydraulically driven device, second means connecting said hydraulically driven device to said pump, said last named means including a blocking valve, a pressure relief valve, said second means including a pressure reducer valve located between said hydraulically driven device and said blocking valve, third means connecting said pressure relief valve to said pump, means for opening said blocking valve when said pressure relief valve opens, and means for releasing said blocking valve for movement to a closed position when said first valve means opens.

9. In combination, a hydraulic motor having an inlet and outlet, an accumulator for operating said motor, first valve means connecting said accumulator to the inlet of said motor, a fluid supply under pressure, said fluid supply under pressure including a pump and reservoir, first means connecting said accumulator to said pump, said first means including a check valve, a hydraulically driven device, second means connecting said hydraulically driven device to said pump, said last named means including a blocking valve, a pressure relief valve, said second means including a pressure reducer valve located between said hydraulically driven device and said blocking valve, third means connecting said pressure relief valve to said pump, fourth means connecting the outlet of said motor to said reservoir, fifth means connecting said pressure relief valve and said pressure reducing valve to said reservoir, means for opening said blocking valve when said pressure relief valve opens, and means for releasing said blocking valve for movement to a closed position when said first valve means opens.

10. In a starting system for an engine, a hydraulic motor having an inlet and outlet, a reservoir having an inlet and outlet, a first passageway connecting the outlet of said hydraulic motor to the inlet of said reservoir, a pump having an inlet and outlet, a second passageway connecting the outlet of said reservoir to the inlet of said pump, a third passageway connecting the outlet of said pump to the inlet of said hydraulic motor, a starting valve in said third passageway, an accumulator in said third passageway connected between said starting valve and pump outlet, a check valve in said third passageway connected between said accumulator and pump outlet, a pressure relief valve having an inlet and outlet, a fourth passageway connecting the third passageway at a point between the check valve and the outlet of the pump to the inlet of said pressure relief valve, a fifth passageway connecting the outlet of said relief valve to the inlet of said reservoir, a blocking valve having an inlet and outlet, a sixth passageway connecting the fourth passageway to the inlet of said blocking valve, a seventh passageway connecting the outlet of said blocking valve to said first passageway, and a fluid driven device in said seventh passageway, said blocking valve being responsive to said pressure relief valve for opening, said blocking valve being responsive to said starting valve for closing.

11. In a starting system for an engine, a hydraulic motor having an inlet and outlet, a reservoir having an inlet and outlet, a first passageway connecting the outlet of said hydraulic motor to the inlet of said reservoir, a pump having an inlet and outlet, a second passageway connecting the outlet of said reservoir to the inlet of said pump, a third passageway connecting the outlet of said pump to the inlet of said hydraulic motor, a starting valve in said third passageway, an accumulator in said third passageway connected between said starting valve and pump outlet, a check valve in said third passageway connected between said accumulator and pump outlet, means for permitting reverse flow around said check valve, a pressure relief valve having an inlet and outlet, a fourth passageway connecting the third passageway at a point between the check valve and the outlet of the pump to the inlet of said pressure relief valve, a fifth passageway connecting the outlet of said relief valve to the inlet of said reservoir, a blocking valve having an inlet and outlet, a sixth passageway connecting the fourth passageway to the inlet of said blocking valve, a seventh passageway connecting the outlet of said blocking valve to said first passageway, and a fluid driven device in said seventh passageway, said blocking valve being responsive to said pressure relief valve for opening, said blocking valve being responsive to said starting valve for closing.

12. In a starting system for an engine, a starter pinion, a hydraulic motor having an inlet and outlet for driving said pinion, a reservoir having an inlet and outlet, a first passageway connecting the outlet of said hydraulic motor to the inlet of said reservoir, a pump having an inlet and outlet, a second passageway connecting the outlet of said reservoir to the inlet of said pump, a third passageway connecting the outlet of said pump to the inlet of said hydraulic motor, a starting valve in said third passageway, an accumulator in said third passageway connected between said starting valve and pump outlet, a check valve in said third passageway connected between said accumulator and pump outlet, a pressure relief valve having an inlet and outlet, a fourth passageway connecting the third passageway at a point between the check valve and the outlet of the pump to the inlet of said pressure relief valve, a fifth passageway connecting the outlet of said relief valve to the inlet of said reservoir, a blocking valve having an inlet and outlet, said blocking valve being biased closed, a sixth passageway connecting the fourth passageway to the inlet of said blocking valve, a seventh passageway connecting the outlet of said blocking valve to said first passageway, and a fluid driven device in said seventh passageway, said blocking valve being responsive to said pressure relief valve for opening, said blocking valve being responsive to said starting valve for closing.

13. In a starting system for an engine, a hydraulic motor having an inlet and outlet, a reservoir having an inlet and outlet, a first passageway connecting the outlet of said hydraulic motor to the inlet of said reservoir, a pump having an inlet and outlet, a second passageway connecting the outlet of said reservoir to the inlet of said pump, a third passageway connecting the outlet of said pump to the inlet of said hydraulic motor, a starting valve in said third passageway, an accumulator in said third passageway connected between said starting valve and pump outlet, a check valve in said third passageway connected between said accumulator and pump outlet, a pressure relief valve having an inlet and outlet, a fourth passageway connecting the third passageway at a point between the check valve and the outlet of the pump to the inlet of said pressure relief valve, a fifth passageway connecting the outlet of said relief valve to the inlet of said reservoir, a blocking valve having an inlet and outlet, a sixth passageway connecting the fourth passageway to the inlet of said blocking valve, a seventh passageway connecting the outlet of said blocking valve to said first passageway, and a fluid driven device in said seventh passageway, a pressure reducer valve in said seventh passageway located between said blocking valve and said fluid driven device, said blocking valve being responsive to said pressure relief valve for opening, said blocking valve being responsive to said starting valve for closing.

14. A compound valve including a housing, a blocking valve in said housing, a pressure relief valve in said housing, said blocking valve having a first bore, a first piston in said first bore, said pressure relief valve having a second bore, a second piston in said second bore, said pistons being biased to one end of said bores, said pistons being connected to move together, a holding member projecting externally of said housing for holding said pistons away from said one end of said bores, said blocking valve having first means for connecting said first bore to a first outlet, said relief valve having second means for connecting said second bore to a second outlet, said first and second connecting means being connected to move together, and means for permitting said pressure relief valve to close while said blocking valve remains open.

15. A valve including a housing, a first bore in said housing, a second bore in said housing, a first piston in said first bore, a second piston in said second bore, said first and second pistons being connected for like movement, said pistons being biased towards one end of said first and second bores, an inlet passage in said housing extending into said first bore where it is covered by said first piston in its biased position, said inlet passage extending into said second bore at a point behind a face of said second piston, a third bore in said housing, a third piston in said third bore, a fourth piston in said fourth bore, said third and fourth pistons being connected for like movement, said third and fourth pistons being biased towards one end of said third and fourth bores, a first passageway connecting said first bore at a midpoint to said third bore at its end where it is covered by said third piston in its biased position, a first outlet passage extending from said third bore where it is covered by said third piston in its biased position, a second passageway connecting said second bore at midpoint to said fourth bore at its end where it enters between said fourth piston and end of said fourth bore to which it is biased, and a second outlet passage extending from said fourth bore between the face of the fourth piston facing the end of said fourth bore to which it is biased and the other end of said fourth bore.

16. A valve including a housing, a first bore in said housing, a second bore in said housing, a first piston in said first bore, a second piston in said second bore, said first and second pistons being connected for like movement, said pistons being biased towards one end of said first and second bores, a holding member projecting externally of said housing and connected to said first and second pistons for holding said first piston to the side of the connection of said first passageway permitting said first passageway to be connected with said inlet passage and permitting said second piston to cover said second passageway, an inlet passage in said housing extending into said first bore where it is covered by said first piston in its biased position, said inlet passage extending into aid second bore at a point behind a face of said second piston, a third bore in said housing, a third piston in said third bore, a fourth bore in said housing, a fourth piston in said fourth bore, said third and fourth pistons being connected for like movement, said third and fourth pistons being biased towards one end of said third and fourth bores, a first passageway connecting said first bore at a midpoint to said third bore at its end where it is covered by said third piston in its biased position, a first outlet passage extending from said third bore where it is covered by said third piston in its biased position, a second passageway connecting said second bore at midpoint to said fourth bore at its end where it enters between said fourth piston and end of said fourth bore to which it is biased, and a second outlet passage extending from said fourth bore between the face of the fourth piston facing the end of said fourth bore to which it is biased and the other end of said fourth bore.

17. In combination, a valve including a housing, a first bore in said housing, a second bore in said housing, a first piston in said first bore, a second piston in said second bore, said first and second pistons being connected for like movement, said pistons being biased towards one end of said first and second bores, a holding member projecting externally of said housing and connected to said first and second pistons for holding said first piston to the side of the connection of said first passageway permitting said first passageway to be connected with said inlet passage and permitting said second piston to cover said second passageway, first means for holding said holding member, a second valve, said valve being biased to a closed position, means for releasing said first holding means when said second valve is opened, an inlet passage in said housing extending into said first bore where it is covered by said first piston in its biased position, said inlet passage extending into said second bore at a point behind a face of said second piston, a third bore in said housing, a third piston in said third bore, a fourth bore in said housing, a fourth piston in said fourth bore, said third and fourth pistons being connected for like movement, said third and fourth pistons being biased towards one end of said third and fourth bores, a first passageway connecting said first bore at a midpoint to said third bore at its end where it is covered by said third piston in its biased position, a first outlet passage extendng from said third bore where it is covered by said third piston in its biased position, a second passageway connecting said second bore at midpoint to said fourth bore at its end where it enters between said fourth piston and end of said fourth bore to which it is biased, a second outlet passage extending from said fourth bore between the face of the fourth piston facing the end of said fourth bore to which it is biased and the other end of said fourth bore.

18. In combination, a motor, an accumulator for operating said motor, first valve means connecting said accumulator to said motor, a fluid supply under pressure, first means connecting said accumulator to said fluid supply under pressure, said first means including a check valve, a hydraulically driven device, a compound valve including a housing, a blocking valve in said housing, a pressure relief valve in said housing, said blocking valve and said pressure relief valve being biased to a closed position, means in said housing for opening said blocking valve when said pressure relief valve opens, a holding member projecting externally of said housing for holding said blocking valve open, means in said housing for permitting said pressure relief valve to close while said blocking valve remains open, second means connecting said blocking valve to said fluid supply under pressure, third means connecting said blocking valve to said hydraulically driven device, fourth means connecting said pressure relief valve to said fluid supply under pressure, means for holding said holding member, and means for actuating said holding means to release said blocking valve for movement to a closed position when said first valve means opens.

19. In combination, a motor, an accumulator for operating said motor, first valve means connecting said accumulator to said motor, a fluid supply under pressure, first means connecting said accumulator to said fluid supply under pressure, said first means including a check valve, a hydraulically driven device, second means connecting said hydraulically driven device to said fluid supply under pressure, said last named means including valve means for controlling the flow of fluid to said hydraulically driven device, a pressure relief valve, and third means connecting said pressure relief valve to said fluid supply under pressure, said valve means being responsive to a movement of said pressure relief valve.

20. In combination, a motor, an accumulator for operating said motor, first valve means connecting said accumulator to said motor, a fluid supply under pressure, said fluid supply including a pump and reservoir, first means connecting said accumulator to said pump, said first means including a check valve, a hydraulically driven device, second means connecting said hydraulically driven device to said fluid supply under pressure, said last named means including valve means for controlling the flow of fluid to said hydraulically driven device, a pressure relief valve, third means connecting said pressure relief valve to said fluid supply under pressure, said valve means being responsive to a movement of said pressure relief valve, first line means connecting said motor to said reservoir, and second line means connecting said hydraulically driven device to said reservoir.

21. In combination, a motor, an accumulator for operating said motor, first valve means connecting said accumulator to said motor, a fluid supply under pressure, first means connecting said accumulator to said fluid supply under pressure, said first means including a check valve, a hydraulically driven device, second means connecting said hydraulically driven device to said fluid supply under pressure, said last named means including a blocking valve, a pressure relief valve, third means connecting said pressure relief valve to said fluid supply under pressure, means for opening said blocking valve when said pressure relief valve opens, and means for releasing said blocking valve for movement to a closed position.

22. A compound valve including a housing, a blocking valve in said housing, a pressure relief valve in said housing, said blocking valve having a first bore, a first piston in said first bore, said pressure relief valve having a second bore, a second piston in said second bore, said pistons being biased towards one end of said bores, said pistons being connected to move together, holding means projecting externally of said housing for holding said pistons away from said one end of said bores, and means for permitting said pressure relief valve to close while said blocking valve remains open.

References Cited in the file of this patent

UNITED STATES PATENTS

| | | |
|---|---|---|
| 1,787,781 | Galloway | Jan. 6, 1931 |
| 1,816,829 | De Leeuw | Aug. 4, 1931 |
| 2,145,533 | Starr | Jan. 31, 1939 |
| 2,793,498 | Banker | May 28, 1957 |
| 2,846,850 | Hall | Aug. 12, 1958 |
| 2,873,577 | Kenney et al. | Feb. 17, 1959 |